US 8,872,054 B2

(12) United States Patent
Yamazaki et al.

(10) Patent No.: US 8,872,054 B2
(45) Date of Patent: Oct. 28, 2014

(54) SWITCH UNIT AND SWITCHGEAR EQUIPPED THEREWITH

(75) Inventors: Miki Yamazaki, Kashiwa (JP); Kenji Tsuchiya, Hitachi (JP); Ayumu Morita, Hitachi (JP); Tomoaki Utsumi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 421 days.

(21) Appl. No.: 13/298,320

(22) Filed: Nov. 17, 2011

(65) Prior Publication Data

US 2012/0132622 A1 May 31, 2012

(30) Foreign Application Priority Data

Nov. 30, 2010 (JP) ................... 2010-265900

(51) Int. Cl.
| | | |
|---|---|---|
| H01H 33/66 | (2006.01) | |
| H05K 7/20 | (2006.01) | |
| H02B 1/56 | (2006.01) | |
| H02B 13/01 | (2006.01) | |
| H02B 13/035 | (2006.01) | |
| H01H 33/56 | (2006.01) | |
| H01H 33/662 | (2006.01) | |

(52) U.S. Cl.
CPC .......... *H02B 13/01* (2013.01); *H01H 2033/566* (2013.01); *H02B 1/56* (2013.01); *H01H 2033/6623* (2013.01); *H01H 2033/6613* (2013.01); *H02B 13/0354* (2013.01)
USPC ............ 218/134; 218/139; 218/155; 361/703

(58) Field of Classification Search
CPC ..... H01H 33/66; H01H 33/66; H01H 31/003; H01H 33/66207
USPC ......... 218/118–120, 134, 139, 140, 153–155, 218/7, 9, 10, 14
See application file for complete search history.

(56) References Cited

U.S. PATENT DOCUMENTS

| | | | | |
|---|---|---|---|---|
| 6,897,396 | B2 * | 5/2005 | Ito et al. .......................... | 218/120 |
| 7,148,441 | B2 * | 12/2006 | Daharsh et al. ................ | 218/136 |
| 2008/0144279 | A1 | 6/2008 | Yamamoto et al. | |

FOREIGN PATENT DOCUMENTS

| | | |
|---|---|---|
| CN | 2567619 | 8/2003 |
| CN | 201593773 | 9/2010 |

(Continued)

OTHER PUBLICATIONS

Japanese Office Action in corresponding Japanese Application No. 2010-265900, dated Apr. 23, 2013 and English language translation thereof.

(Continued)

*Primary Examiner* — Amy Cohen Johnson
*Assistant Examiner* — Marina Fishman
(74) *Attorney, Agent, or Firm* — Antonelli, Terry, Stout & Kraus, LLP.

(57) ABSTRACT

In order to improve cooling performance of a switch unit or switchgear equipped with the switch unit, the switch unit includes a switch having a movable electrode and a fixed electrode and is casted as one body with a resin, the resin is provided with resin fins, and the thickness of the resin fin is changed so that the resin fin has a thickness sloped in the longitudinal direction of the resin fin.

8 Claims, 4 Drawing Sheets

(56) References Cited

FOREIGN PATENT DOCUMENTS

| | | |
|---|---|---|
| DE | 10 2007 057 472 | 6/2008 |
| EP | 0 239 460 | 9/1987 |
| EP | 1 107 409 | 6/2001 |
| JP | 5-303929 | 11/1993 |
| JP | 2001-160342 | 6/2001 |
| JP | 2007-28810 | 2/2007 |
| JP | 2007-73816 | 3/2007 |
| JP | 2008-140802 | 6/2008 |
| KR | 20-0211202 | 11/2000 |
| WO | WO 2005/062325 | 7/2005 |

OTHER PUBLICATIONS

Japanese Office Action in corresponding Japanese Application No. 2010-265900, dated Jul. 2, 2013, and English language translation thereof.

Communication in corresponding European Appln. No. 11190903.2, dated Nov. 28, 2013.

Office Action in corresponding Chinese Application No. 201110384270.3, mailed Jan. 6, 2014, and English translation thereof.

\* cited by examiner

SWITCH UNIT AND SWITCHGEAR EQUIPPED THEREWITH

CLAIM OF PRIORITY

The present application claims priority from Japanese Patent application serial No. 2010-265900, filed on Nov. 30, 2010, the content of which is hereby incorporated by reference into this application.

TECHNICAL FIELD

The present invention relates to a resin molded switch unit and switchgear equipped with the switch unit, and particularly to those that improve their cooling performance.

BACKGROUND ART

Switchgear is disposed in an electric power system as power-receiving and power-distributing equipment for receiving electric power generated in and sent from a power plant and for distributing it to the load side. High current runs in the switchgear, which makes the current conducting area fairly hot during the use, thus the switchgear must have a cooling capacity.

Patent literature 1 states switchgear having a cooling capacity. In the patent literature 1, cooling performance is enhanced by providing resin-made or metal-made fins to a resin layer covering the switchgear.

CITATION LIST

Patent Literature

[Patent Literature 1] Japanese Patent Laid-open No. 2001-160342

SUMMARY OF INVENTION

Technical Problem

In the switchgear stated in the patent literature 1, the height and the spacing of the fins are constant so that it is difficult to perform effective cooling according to resin properties.

Thus, an object of the present invention is to provide a switch unit or switchgear equipped with the switch unit that improves their cooling performance.

Solution to Problem

In order to solve the above problem, the switch unit according to the present invention includes a switch having a movable electrode and a fixed electrode, the switch unit is casted as one body with a resin, the resin is provided with resin fins, and the thickness of the resin fin is changed so that the resin fin has a thickness sloped in the longitudinal direction of the resin fin.

In addition, switchgear according to the present invention has the above switch unit, a bus bar, a load side cable, and an operation device for operating the switch unit.

Advantageous Effects of Invention

According to the switch unit or the switchgear of the present invention, their cooling performance can be improved.

DESCRIPTION OF EMBODIMENTS

Preferred embodiments for carrying out the present invention will be described below. The following are only examples and, needless to say, they are not to specify the embodiment of the present invention.

(Embodiment 1)

Embodiment 1 will be described with reference to FIGS. 1 to 4.

Figure 1:
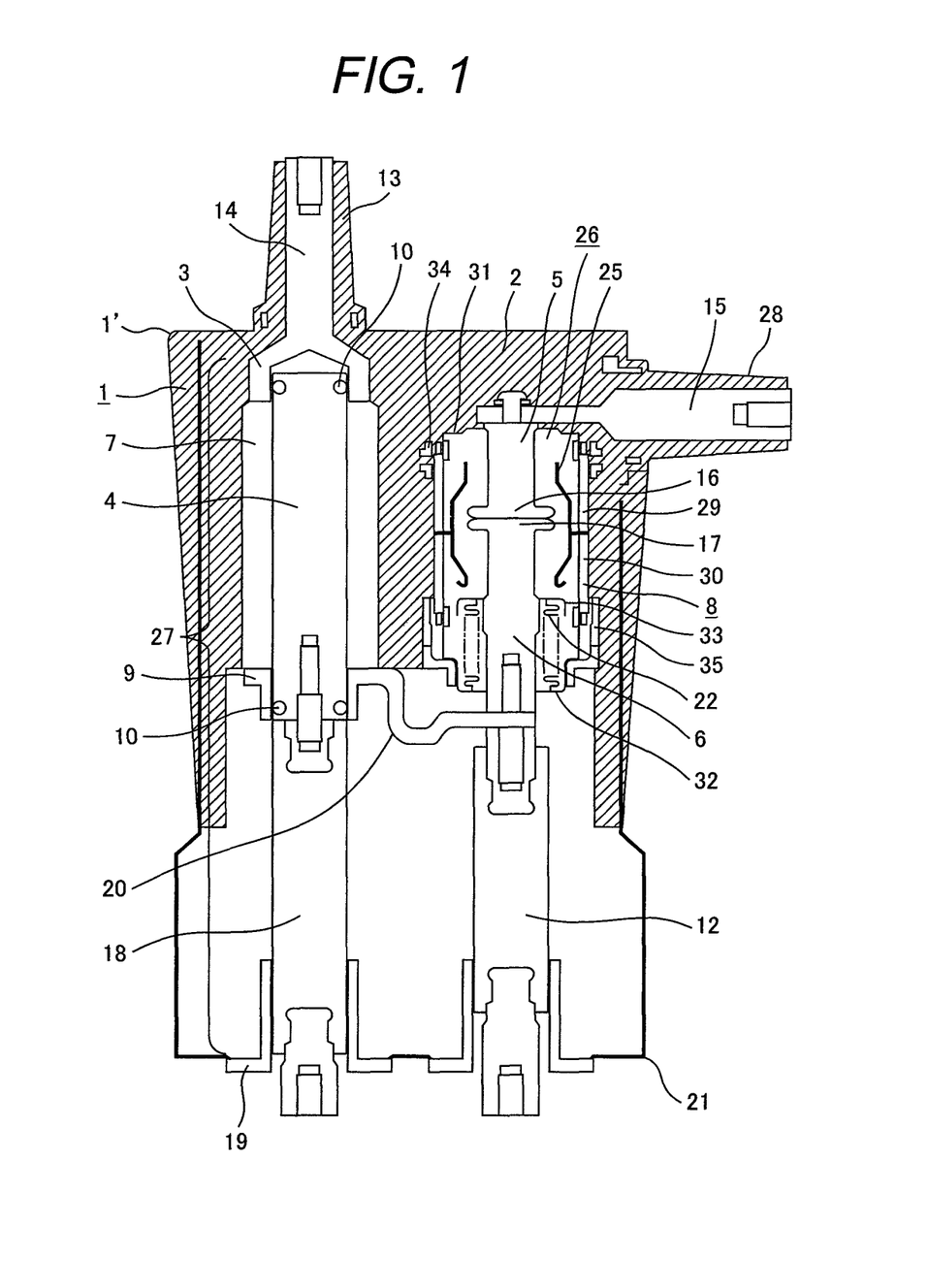
FIG. 1 is a side sectional view of a switch unit according to Embodiment 1.

As shown in FIG. 1, a switch unit according to the present invention is constituted mainly by a grounded metal case 21, a solid insulator 2 (resin) such as an epoxy resin to be connected to the metal case 21, and a vacuum valve 26, a ground disconnecting portion 27, a bus bushing 13, and a cable bushing 28, which are casted as one body with the solid insulator 2.

The vacuum valve 26 is equipped with a fixed-side electrode 16, a movable-side electrode 17, a fixed-side conductor 5 to be connected with the fixed-side electrode 16, a movable-side conductor 6 to be connected with the movable-side electrode 17, and an arc shield 25 for protecting ceramic insulation tubes 29 and 30 from arc generated by the electrodes in open/close operations, in a vacuum container 8 made up by connecting the fixed-side ceramic insulation tube 29, the movable-side ceramic insulation tube 30, a fixed-side end plate 31, and a movable-side end plate 32. The fixed-side conductor 5 is connected to a cable bushing center conductor 15 to allow supplying power to the load side. The cable bushing center conductor 15 is disposed orthogonally to the fixed-side conductor 5 and the conductors are concentrated in the area between the cable bushing center conductor 15 and the fixed-side conductor 5, so that the area can be easily heated up during the use. Furthermore, a bellows 22 is disposed in the movable side to allow movement of the movable-side conductor 6 while maintaining a vacuum state in the vacuum valve 26. In the vacuum valve 26, the bellows 22 connected to the movable-side end plate 32 and the movable-side conductor 6 allows movement of the movable-side electrode 17 and the movable-side conductor 6 in the axial direction while maintaining a vacuum state inside, which allows the valve to switch between closing and interrupting states. In addition, a bellows shield 33 is provided near the connecting portion of the bellows 22 and the movable-side conductor 6 to protect the bellows 22 from arc during open/close operations, which also moderates the concentration of electrical fields in the end portion of the bellows 22. The movable-side conductor 6 is connected to an air-insulated and solid-insulated operation rod 18 for the vacuum valve 26, and the operation rod 18 for the vacuum valve is connected to an operation device not shown in the figure. A fixed-side electric field moderation shield 34 is disposed around the fixed-side ceramic insulation tube 29 to moderate the concentration of electric fields in the connecting portion of the tube 29 and the fixed-side end plate 31; a movable-side electric field moderation shield 35 is disposed around the movable-side ceramic insulation tube 30 to moderate the concentration of electric fields in the connecting portion of the tube 30 and the movable-side end plate 32.

The ground disconnecting portion 27 is connected to a bus bushing center conductor 14 and is provided with a fixed electrode for bushing 3 connected to the bus side through the bus bushing center conductor 14, a ground-side fixed electrode (guide) 19 as a ground potential, an intermediate fixed electrode 9 located between the above electrodes in the axial direction for electrically connecting with the movable-side conductor 6 in the vacuum valve 26-side through a flexible conductor 20; the ground disconnecting portion 27 is air-insulated inside. Each of these electrodes has the same inner diameter and they are disposed linearly. A ground disconnecting portion movable conductor 4 moves inside the ground disconnecting portion 27 linearly to each of these electrodes to allow switching among the three positions of closing, disconnecting, and grounding. The ground disconnecting portion movable conductor 4 is coupled with an air-insulated and solid-insulated operation rod 18 to allow movement by an operation mechanism not shown in the figure. A spring contact 10 is provided on the ground disconnecting portion movable conductor 4 at each site which is in contact with the fixed contact (the fixed electrode) described above, so that reliable contact can be achieved by springiness of the spring contact without disturbing the movement of the ground disconnecting portion movable conductor 4.

The bus bushing 13 is made up by the solid insulator 2 covering around the bus bushing center conductor 14; a cable bushing 28 is made up by the solid insulator 2 covering around the cable bushing center conductor 15.

As a material for the operation rod 12 for the vacuum valve, the operation rod 18 for the ground disconnecting portion, and the solid insulator 2, an epoxy resin is used in consideration of its insulation property, mechanical strength, and formability. The operation rods 12 and 18 and the solid insulator 2 are air-insulated by the surrounding air in addition to the solid-insulation by themselves.

The ground disconnecting portion movable conductor 4, the fixed-side conductor 5, the movable-side conductor 6, an air portion 7, and the vacuum container 8 are casted together as one body with the solid insulator 2; and heat-radiation fins 1 formed with the same material as the solid insulator 2 are provided on the outer surface of the solid insulator 2 covering the ground disconnecting movable conductor 4, the fixed-side conductor 5, and the movable-side conductor 6. As shown in FIG. 1, on the outer surface nearest to a heat generating source is a maximum fin thickness portion 1', and as it goes away from the heat generating source, the thickness d of the heat-radiation fin 1 on the outer surface is gradually (continuously) decreased. The heat generating source means a site in which conductors are concentrated (a density of the conductors as resistance is high) and electrodes contact with each other (contact resistance is generated.) In addition, the covering of the solid insulator 2 increases airtightness, which reduces heat-radiation performance so that heat tends to be accumulated easily. On the other hand, the heat-radiation performance will be better when the area around the heat generating source above is surrounded by air, despite of the fact that it is around the heat generating source; in this case, the area is less likely to accumulate heat although its heat-generating property is high. For these reasons, the heat-radiation fin in the area between the cable bushing center conductor 15 and the vacuum valve 26, that is, the area which has concentrated conductors and is covered by the solid insulator 2, has a thick fin thickness, and as the fin goes away from the area, the fin thickness becomes thinner. In addition, the fin provided around the spring contact 10 and the fixed electrode for bushing 3, that is, the area which has the electrodes touching with each other and is covered by the solid insulator 2, has a thick fin thickness, and as the fin goes away from the area, the fin thickness becomes thinner. In the present specification, a heat generating source which is covered by the solid insulator 2 is referred to as a heat buildup region. The region around the bus bushing 13 or the cable bushing 28 is a heat buildup region.

Next, a state of the switch unit according to the present embodiment when the unit is in use will be described. When the switch unit is connected to a power system, power is supplied into the switch unit from a bus bar, and additionally, when the ground disconnecting portion 27 is in a closed position and the vacuum switch is power-on, power is sent from the power-system side via the bus bar passing through the bus bushing center conductor 14, the fixed electrode for bushing 3, the spring contact 10, the ground disconnecting portion movable conductor 4, the spring contact 10, the intermediate fixed electrode 9, the flexible conductor 20, the movable-side conductor 6, the movable-side electrode 17, the fixed-side electrode 16, the fixed-side conductor 5, and the cable bushing center conductor 15, to the load side via a cable. In this case, Joule heat is generated in each of the above current conducting sites according to its resistance value. Application of high voltage such as that in switchgear generates an exceedingly large amount of heat, thus it is absolutely necessary to consider heat-release capacity when manufacturing the equipment.

The Joule heat generated in each site during conduction is generated more in the contact area where the ground disconnecting portion movable conductor 4 and the fixed electrode for bushing 3 come in contact with each other through the spring contact 10, and in the contact area between the movable-side electrode 17 and the fixed-side electrode 16; in addition, the released heat tends to accumulate locally around a site near these areas, particularly around the site where the fixed-side conductor 5 and the end portion of the vacuum container are fixed together. Additionally, the temperature of each conductor inside the switch, that is, the ground disconnecting portion movable conductor 4, the fixed-side conductor 5, and the movable-side conductor 6, is increased, promoting thermionic electron emission due to the temperature increase, which unfavorably reduces the insulation performance. In order to prevent the temperature increase, heat generation may be reduced; more specifically, the ground disconnecting portion movable conductor 4, the fixed-side conductor 5, and the movable-side conductor 6 may be increased in size to reduce current density, or the contact pressure against the electrodes 16 and 17 in the switch portion may be increased to reduce contact resistance. However, the former idea will cause the whole apparatus to be larger and the latter idea will cause the capacity per line to be increased since the operation mechanism requires more driving power; consequently, the apparatus may become larger in either case.

Thus, an effective way to deal with the temperature increase is not reducing the heat generation amount by resistance reduction but improving the heat-radiation performance. To improve the heat-radiation performance, in consideration of the fact that the Joule heat generated in each site of the switch during conduction is generated mainly around a conductor and a contact between electrodes, releasing heat focusing on these heat-generating sites would be more effective. However, as in the switch unit of the present embodiment, which is casted as one body using the solid insulator 2, if cooling fins are formed on the entire outer surface of the solid insulator 2, the fins will be uniformly set up including the area which has a small temperature difference between the outer surface of the solid insulator 2 and a panel of the switchgear for storing the switch unit, that is, the area which does not require much improvement in the heat-radiation performance.

In particular, when a fin made of a solid insulator is provided, because its thermal conductivity is low compared to metal, temperature distribution will occur in the fin made of the solid insulator, that is, heat will not be transferred to the area away from the heat-generating site, so that installation of the heat-radiation fin to the area will have little contribution to improve heat-radiation performance. Providing the fins to the entire outer surface will increase the weight of the entire switch unit, thus the fins should not be provided needlessly but should be disposed to a location which allows the fins to contribute to improving the heat-radiation performance, and it is preferable that the form and the installation location of the fins be determined accordingly.

Thus, in the switch unit of the present embodiment, the heat-radiation fin between the cable bushing center conductor 15 and the vacuum valve 26 has a thick fin thickness and, as it goes away from the site, becomes thinner. In addition, the fin provided around the spring contact 10 and the fixed electrode for bushing 3 also has a thick fin thickness and, as it goes away from the site, becomes thinner.

As described above, when current is passed, Joule heat is generated in a current conducting site. The generated Joule heat, then, is transferred to surrounding media and is released outside from the surrounding media. The solid insulator 2 between the cable bushing center conductor 15 and the vacuum valve 26 should have a higher heat-radiation capacity since the heat generated from both the cable bushing center conductor 15 and the vacuum valve 26 are transferred there. In the present embodiment, the heat-radiation fin between the cable bushing center conductor 15 and the vacuum valve 26 is made to have a thick fin thickness and, as it goes away from the site, becomes thinner. The site is a heat buildup region but having a thick fin, its heat-radiation performance can be improved. On the other hand, the farther away from the site or the heat buildup region the fin is, the lower the density of conductors will be, and it is no longer in the vicinity of the heat generating site in the first place. Further, a low thermal conductivity of the solid insulator fin hinders heat from being transferred from the heat buildup region to the distant area. Thus, the need for improving the heat-radiation performance in the area away from the heat buildup region will be less from these views. Therefore, in order to avoid the unit becoming large-sized, the thickness of the heat-radiation fin 1 is gradually made thinner as it goes away from the site or the heat buildup region.

In the same manner, the solid insulator 2 provided around the spring contact 10 and the fixed electrode for bushing 3 is a heat buildup region since the solid insulator 2 is covering the fixed electrode for bushing 3, the ground disconnecting portion movable conductor 4, and the contact area between the spring contact 10 and the fixed electrode for bushing 3. Thus, the heat-radiation fin 1 provided to this site has a thick fin thickness, and as it goes away from the site, the thickness of the heat-radiation fin 1 becomes thinner.

Because of these, the cooling performance can be improved and at the same time, the apparatus can be prevented from becoming unnecessarily large.

Figure 2:
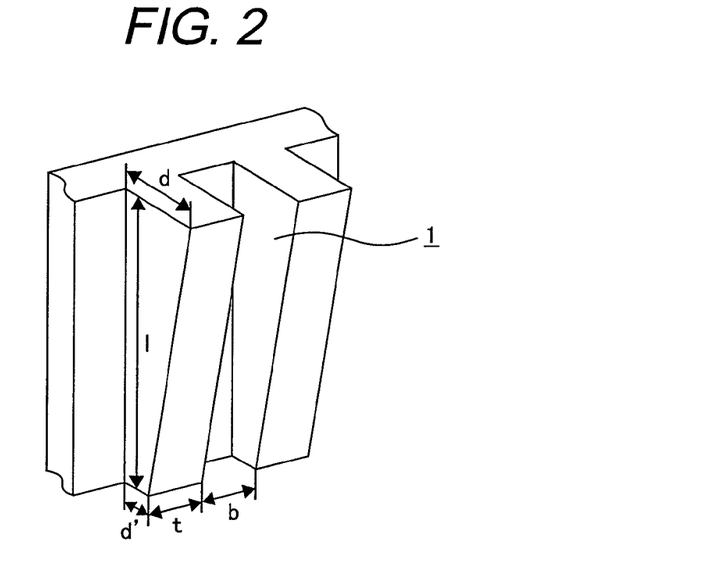
FIG. 2 selectively shows heat-radiation fins according to Embodiment 1.

Optimum design conditions of the heat-radiation fin will be described. Normally, the shape of the heat-radiation fin 1 as a resin casting is, as shown in FIG. 2, formed according to the thickness (d), height (l), plate thickness (t), and fin spacing (b), so that these shape parameters must be appropriately determined. Basically, the heat-radiation fin 1 is for enlarging a heat-transfer surface to the surrounding to reduce the thermal density of the surface, thus the larger the heat-transfer area is, the better the performance will be. However, thoughtless enlargement of the surface area may result in a decrease in a surface heat-transfer coefficient and a decrease in the efficiency of heat transfer to the end of the heat-transfer fin 1. In other words, the heat-transfer fin 1 is most efficient when the temperature of the entire heat-radiation surface is the same as that of the heat source. A metal, because of its high thermal conductivity, is less likely to cause temperature distribution in itself, but in the solid insulator 2 having a low thermal conductivity, the temperature distribution can notably occur; therefore, the thickness of the heat-radiation fin 1 is not uniform but is sloped (in the longitudinal direction of the fin) to allow efficient cooling of the heat-radiation fin 1.

The efficiency of the fin can be shown as a ratio of "an actual heat discharge" to "a heat discharge when the temperature of the entire surface of the heat-radiation fin is equal to that of the heat source"; it can be interpreted as a rate of the effectively working surface area. Using a hyperbolic tangent function (tan h), the efficiency of the fin can be represented as follows.

[Equation 1]

$$\text{Fin efficiency} = \frac{\tanh(md)}{md} \text{ where} \quad (1)$$

$$m = \sqrt{\frac{\text{Average heat} - \text{transfer coefficient of the fin}}{\text{Thermal conductivity of the fin(fin thickness}/2)}},$$

d: fin thickness (m)

For example, when heat is applied to one end of an aluminum plate which is 100 mm in length and 1 mm in plate thickness (thermal conductivity is 0.17 W/mm° C.), the fin efficiency will be around 73% if the average heat-transfer coefficient is $10 \times 10^{-6}$ W/mm$^{2°}$ C. Thus the optimum fin thickness can be determined using the equation (1).

Figure 3:
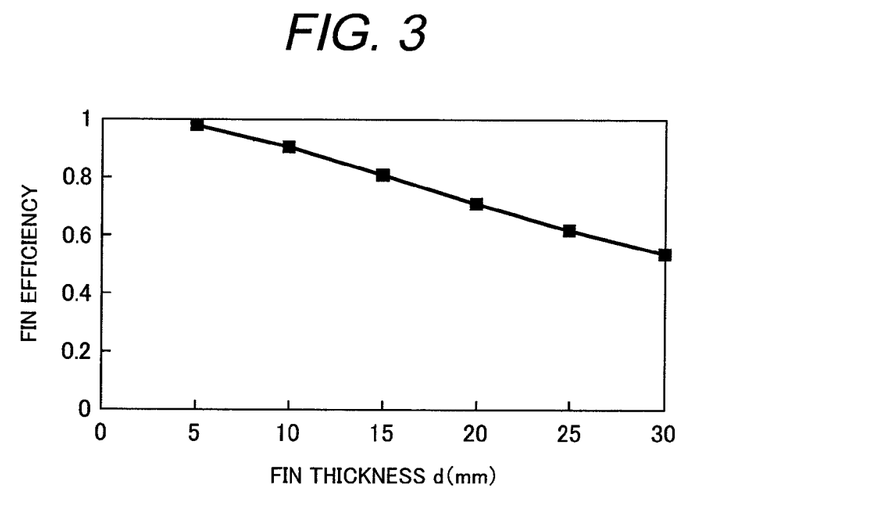
FIG. 3 illustrates a correlation between the fin thickness d and the efficiency of the fin.

For the heat-radiation fin 1 made of the solid insulator 2, a relationship between the thickness of the heat-radiation fin and the fin efficiency is shown in FIG. 3. When the heat-radiation fin 1 is made of the solid insulator 2, the plate thickness t of the fin is limited to at least 10 mm if rounding of R3 or more is provided to the end of the fin to obtain dielectric strength. Thus, in FIG. 3, the fin efficiencies are obtained by using a fin plate thickness t=10 mm, an average heat-transfer coefficient of $10 \times 10^{-6}$ W/mm$^{2°}$ C. assuming natural air-cooling, and a thermal conductivity of resin of $0.6 \times 10^{-3}$ W/mm° C. for substituting into the equation (1). The efficiency will be 100% when a fin thickness d=5 mm or less; however, a thickness of at least 10 mm is necessary when it is made in consideration of forming rounding of R3 to each corner portion of the fin end and fin groove floor since the resin fin is formed using a metallic mold. Thus, an optimum fin spacing b for the heat-radiation fins (a fin spacing for minimizing heat resistance with the same volume) using natural air-cooling when a fin thickness d=10 mm can be estimated by the following equation [reference: Kinshi Ito, Kunimine Naoki, "Toraburu wo sakeru tame no denshi kiki no netsu taisaku sekkei (Heat design of an electronic device to avoid troubles)", Nikkan Kogyo Shimbun (The Business & Technology Daily News)]

[Equation 2]

$$b_{opt} \text{ (mm)} = 5 \times \left[ \frac{\text{Fin height (mm)}}{\text{Allowable temperature rise (°C.)}} \right]^{0.25} \quad (2)$$

Figure 4:
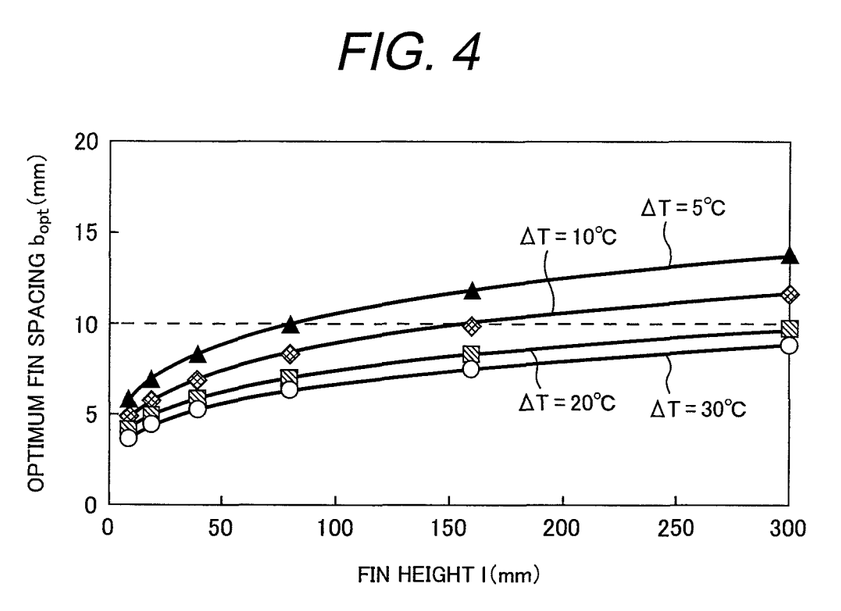
FIG. 4 illustrates a relationship between the fin height 1 and the optimum fin spacing under temperature variation.

FIG. 4 shows a relationship between the optimum spacing of heat-radiation resin fins and the fin height in a temperature rise (ΔT) range. The smaller the temperature rise (ΔT) and the larger the fin height is, the larger the fin spacing becomes. When the fin spacing is too small, heat resistance will be large, thus a spacing of 5 mm or more is necessary when natural air-cooling is used. When the entire resin mold is to have a fin structure, a fin height will be 300 mm and an appropriate fin spacing will be 10 mm at an allowable temperature rise of ΔT=20° C. inside resin. Therefore, the optimum shape of the heat-radiation resin fin in consideration of design conditions (insulation performance) will be a thickness d=10 mm, a plate thickness t=10 mm, and a fin spacing b=10 mm.

In the switch unit of the present embodiment, the heat-radiation fin 1 has a thickness sloped in the longitudinal direction of the fin, so that its cooling performance can be improved compared to the case where the fin thickness is not sloped, and at the same time, this structure prevents the unit from becoming unnecessarily large.

In addition, the thickness of the fin is thick at a heat buildup region and becomes thinner as it goes away from the region; in this way, more appropriate cooling can be achieved according to temperature conditions occurred during conduction.

In the switch unit of the present invention, a breaker and a grounding switch are molded together as one body using the solid insulator 2; in this way, the size of the unit is reduced by the optimization while enhancing the insulation property. The switch unit reduced in size in such way is highly airtight and heat can concentrate in it easily, thus, not the reduction of heat-generation, but the improvement in heat-radiation performance is greatly needed. The present embodiment is more suitable in this regard since the solid insulator 2 of the switch unit is provided with the heat-radiation fins 1 having a slope. In addition, this structure can prevent the unit from becoming large-sized and therefore allows the unit to be reduced in size. In fact, this unit is very small as a switch unit with such heat-radiation performance.

Furthermore, in the present embodiment, the grounding switch is added with a disconnecting function also and provided as a ground disconnecting portion, thus the unit can achieve further size reduction in addition to the above point. Needless to say that the switch unit further reduced in size in such way and the heat-radiation fins 1 of the present embodiment go well together.

(Embodiment 2)

Figure 5:
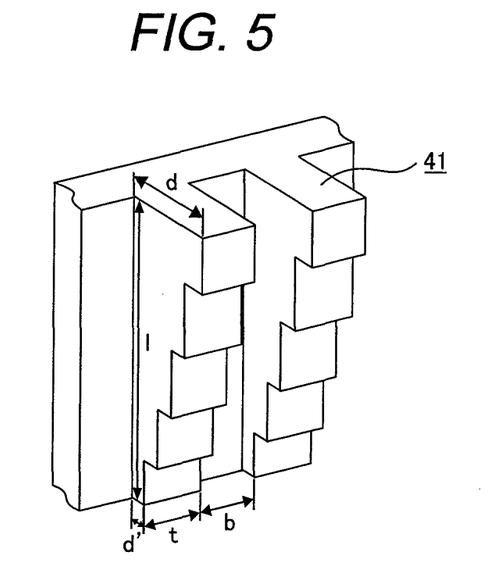
FIG. 5 selectively shows heat-radiation fins according to Embodiment 2.

Embodiment 2 will be described with reference to FIG. 5. The present embodiment has a heat-radiation fin 41 which has a slope increased or decreased in stages (discontinuously) instead of a slope deceased gradually (continuously) as in Embodiment 1. The other components are the same as Embodiment 1, thus descriptions for those will not be repeated.

Various effects described in Embodiment 1 can be obtained also by constructing the heat-radiation fins 41 according to the present embodiment. The important points common to the both embodiments are that the thickness of the resin-made heat-radiation fin is not uniform but sloped (varied), and that the thickness of the heat-radiation fin around the heat buildup region is the thickest to achieve more effect.

(Embodiment 3)

Figure 6:
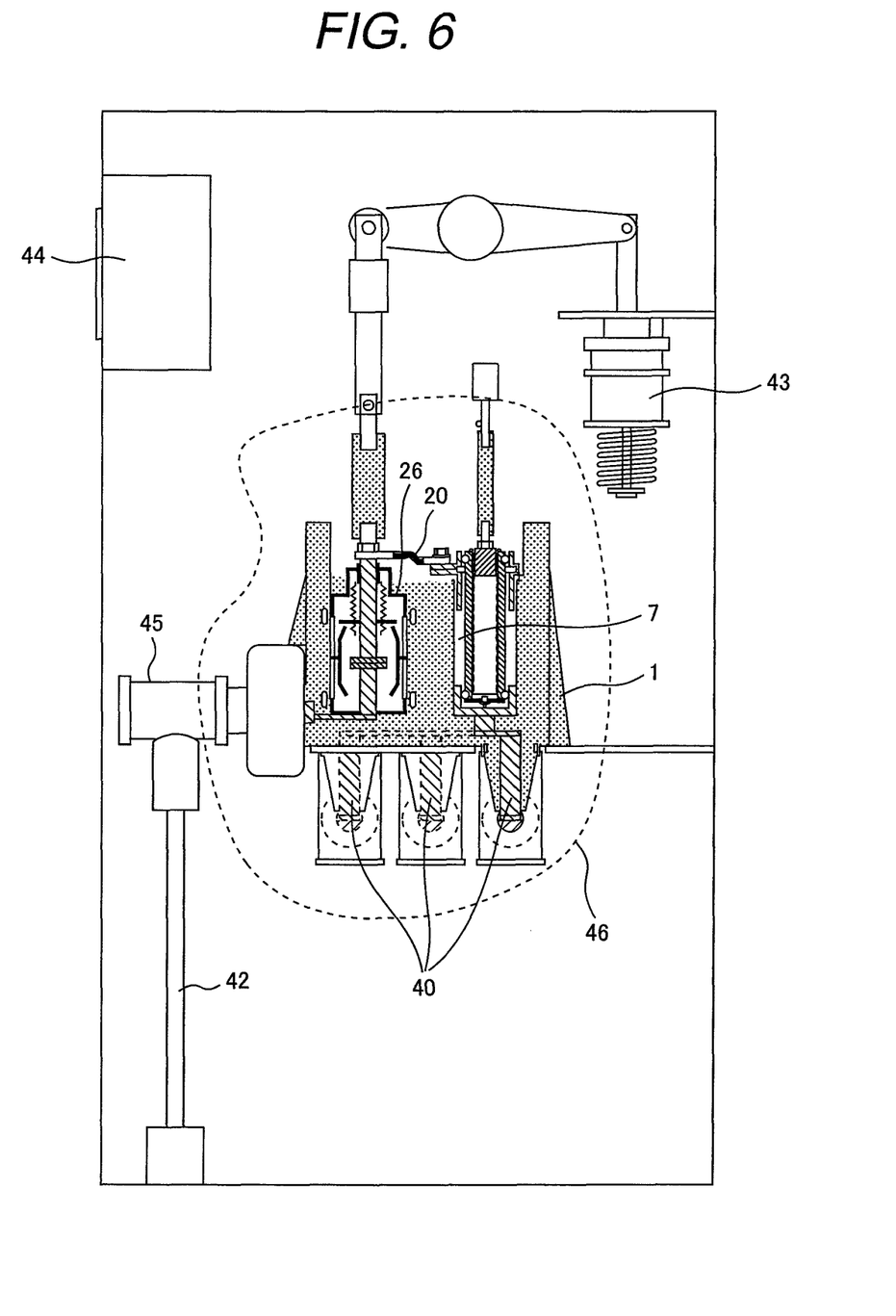
FIG. 6 shows switchgear according to Embodiment 3.

Embodiment 3 will be described with reference to FIG. 6. Switchgear according to the present embodiment is constituted mainly by a bus bar 40 connected to the power system side for receiving power, a switch unit 46 having a switch connected to the bus bar 40, a cable 42 for supplying power from the switch unit 46 to the load side, a cable head 45 for joining the cable 42 and the switch unit 46 of Embodiment 1, an operation device 43 for operating the switch in the switch unit 46, and a control instrument room 44 for storing a protection relay, etc. for protecting instruments at the time of overcurrent detection or lightning strike.

The switch unit 46 is not limited to the one described in Embodiment 1, but various switch units are applicable including those described in each of the above embodiments. In doing so, each effect described above at least is not to be reduced by applying the switch unit to the switchgear.

In the switchgear of the present embodiment, the switch unit 46 is provided with heat-radiation resin fins having a thickness sloped in the longitudinal direction of the fin, so that cooling performance can be improved for the switchgear as a whole since the switch unit is the main site of high heat-generation in the switchgear (panel).

Moreover, it is notable that reducing the size of the switch unit, which is the main portion in the switchgear, allows the entire switchgear to be reduced in size as well.

What is claimed is:

1. A switch unit, comprising:
   a switch having a movable electrode and a fixed electrode facing the movable electrode;
   a bushing conductor to be electrically connected to one of the movable electrode and the fixed electrode and to be connected to a bus bar; and
   a bushing conductor to be electrically connected to the other of the movable electrode or the fixed electrode and to be connected to a cable;
   wherein the switch unit is casted as one body with a resin, the resin is provided with resin fins, and the resin fin has a thickness sloped in the longitudinal direction of the resin fin, the longitudinal direction of the resin fin being substantially the same as longitudinal direction of the switch.

2. The switch unit according to claim 1,
   wherein the thickness of the resin fin is thick near a heat buildup region and thin near a region having a small amount of heat generation.

3. The switch unit according to claim 2,
   wherein the heat buildup region is a region around each bushing conductor and the thickness of the resin fin around the bushing conductor is the thickest.

4. The switch unit according to claim 1,
   wherein the switch is a breaker having a closing function and a current interrupting function, and
   wherein the switch unit further includes a grounding switch being capable of switching between closing and grounding.

5. The switch unit according to claim 4,
   wherein the breaker is a vacuum circuit breaker installing the movable electrode and the fixed electrode in a vacuum container, and
   wherein the grounding switch is a ground disconnecting switch being capable of switching among closing, disconnecting, and grounding.

6. The switch unit according to claim 1, wherein the thickness of the resin fin is continuously increased or decreased.

7. The switch unit according to claim 1, wherein the thickness of the resin fin is increased or decreased in stages.

8. Switchgear comprising:
the switch unit according to claim 1, a bus bar, a load-side cable, and an operation device for operating the movable electrode.

* * * * *